United States Patent
Burdsall, II et al.

[11] Patent Number: 6,098,925
[45] Date of Patent: Aug. 8, 2000

[54] ADAPTIVE DEPLOYABLE RAMP FOR SUPPRESSION OF AIRCRAFT WEAPONS BAY ACOUSTIC LOADS

[75] Inventors: Charles Wesley Burdsall, II, Huntington Beach; John Alan Volk, Monrovia, both of Calif.

[73] Assignee: Northrop Grumman Corporation, Los Angeles, Calif.

[21] Appl. No.: 09/371,970

[22] Filed: Aug. 10, 1999

[51] Int. Cl.[7] ................................................ B64D 1/06
[52] U.S. Cl. ................... 244/118.1; 244/130; 244/137.1
[58] Field of Search ............................. 244/118.1, 137.1, 244/130, 129.1, 129.4, 129.5

[56] References Cited

U.S. PATENT DOCUMENTS

| | | | |
|---|---|---|---|
| 2,265,206 | 12/1941 | Stampfl | 244/130 |
| 2,451,479 | 10/1948 | Diehl | 244/130 |
| 2,749,064 | 6/1956 | Kuhlman, Jr. | 244/137 |
| 2,791,387 | 5/1957 | Weinberg | 244/137 |
| 3,053,488 | 8/1962 | Cox, Jr. | 244/130 |
| 3,586,267 | 6/1971 | Sundberg | 244/213 |
| 3,934,846 | 1/1976 | Maurer | 244/130 |
| 4,102,519 | 7/1978 | Crosby, Jr. | 244/219 |
| 4,290,639 | 9/1981 | Herpel | 296/263 |
| 4,401,338 | 8/1983 | Caldwell | 296/263 |
| 4,509,786 | 4/1985 | Gregg | 296/263 |
| 4,697,764 | 10/1987 | Hardy et al. | 244/137.4 |
| 4,776,537 | 10/1988 | Garside et al. | 244/130 |
| 4,781,342 | 11/1988 | Hardy et al. | 244/137.4 |
| 4,858,850 | 8/1989 | McNay | 244/130 |
| 5,340,054 | 8/1994 | Smith et al. | 244/1 |
| 5,699,981 | 12/1997 | McGrath et al. | 244/1 |
| 5,803,405 | 9/1998 | Ellis et al. | 244/130 |
| 5,818,947 | 10/1998 | Cattafesta, III et al. | 244/130 |
| 5,845,879 | 12/1998 | Jensen | 244/130 |

*Primary Examiner*—Galen L. Barefoot
*Attorney, Agent, or Firm*—Terry J. Anderson; Karl J. Hoch, Jr.

[57] ABSTRACT

An adaptive ramp mechanism for an aircraft having a fuselage which includes a fuselage skin, an interior cavity, a forward end and an aft end, and at least one door attached to the fuselage and moveable between an open position exposing the interior cavity and a closed position enclosing the interior cavity. The ramp mechanism comprises a ramp structure which is attached to the fuselage between the forward end and the interior cavity thereof. The ramp structure is movable between an undeployed position whereat it is substantially continuous with the fuselage skin such that when the door is in the closed position, a free stream of air flowing along the fuselage is attached to the fuselage skin and the door, and undeployed position whereat at least a portion thereof extends angularly relative to the fuselage skin such that when the door is in the open position, the free stream of air is deflected over the interior cavity and reattaches to the fuselage skin between the interior cavity and the aft end of the fuselage.

15 Claims, 3 Drawing Sheets

ADAPTIVE DEPLOYABLE RAMP FOR SUPPRESSION OF AIRCRAFT WEAPONS BAY ACOUSTIC LOADS

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention relates generally to aircraft, and more particularly to an improved apparatus and related method for achieving flow control about a military aircraft weapons bay.

As is well known, many types of military aircraft are provided with a weapons bay which is located on the underside of the aircraft fuselage. The weapons bay is typically enclosed by a pair of weapons bay doors which, when closed, are generally continuous with the fuselage. The opening of the weapons bay doors allows for the ejection of equipment or stores (e.g., munitions) from within the weapons bay.

In existing military aircraft, the opening of the weapons bay doors during flight often results in highly unstable aerodynamic flow which buffets aircraft structures and/or equipment/stores within the weapons bay, and further causes acoustically excited vibrations. As will be recognized, the impingement of the airstream against such structures and/or equipment/stores could potentially damage the same, with the acoustically excited vibrations also being a potential cause of damage thereto and to the aircraft itself. These large, unsteady forces may also have adverse effects on the ejection of the equipment or stores from the weapons bay. In this respect, safe ejection requires that the equipment or stores exit the aircraft in a stable manner so that they do not impinge the aircraft, and such that guided equipment or stores may be brought under control before entering an unstable trajectory.

In order to address these problems, aircraft designers typically either have to make more rugged the aircraft structures, equipment, and/or stores within and in close proximity to the weapons bay, or provide spoilers on the aircraft which deploy when the weapons bay doors are opened. The use of more rugged structures, equipment, and/or stores can add severe weight and cost penalties to the aircraft and its weapons systems. Though spoilers are effective, their efficacy is limited to only certain flight regimes. In this respect, modern military aircraft require weapons deployment under more diverse and adverse flight conditions, thus establishing a need for a more cost effective weapons bay acoustic load suppression device which is tunable, or can be adjusted to accommodate a wide variety of flight conditions. The present invention addresses this particular need in the prior art.

BRIEF SUMMARY OF THE INVENTION

In accordance with the present invention, there is provided an adaptive ramp mechanism for an aircraft having a fuselage which includes a fuselage skin, an interior cavity, a forward end and an aft end. In addition to the fuselage, the aircraft includes at least one door which is attached to the fuselage and moveable between an open position exposing the interior cavity and a closed position enclosing the interior cavity. The ramp mechanism comprises a ramp structure which is attached to the fuselage between the forward end and the forward wall of the interior cavity thereof. The ramp structure is moveable between an undeployed position whereat it is substantially flush or continuous with the fuselage skin such that when the door is in the closed position, a free stream of air flowing along the fuselage is attached to the fuselage skin and the door, and a deployed position whereat at least a portion thereof extends angularly relative to the fuselage skin such that when the door is in the open position, the free stream of air is deflected over the interior cavity and reattaches to the fuselage skin between the rear wall of the interior cavity and the aft end of the fuselage.

In one embodiment of the present invention, the ramp structure comprises a deflection plate which is pivotally connected to the fuselage. The deflection plate is substantially continuous with the fuselage skin when the ramp structure is in the undeployed position, and extends angularly relative to the fuselage skin when the ramp structure is in the deployed position. In addition to the deflection plate, the ramp structure includes an extensible and collapsible sidewall which is attached to the deflection plate and extends between the fuselage skin and the deflection plate when the ramp structure is in the deployed position. The sidewall may comprise a series of sliding plates or folding plates, or alternatively a flexible membrane which is preferably fabricated from a rod reinforced elastomeric material.

In addition to the ramp structure, the ramp mechanism of the present invention comprises an actuator which is mechanically coupled to the ramp structure for facilitating the movement thereof between the undeployed and deployed positions. In one embodiment of the present invention, the actuator comprises a scissor-lift mechanism which is attached to and extends between the fuselage and the ramp structure.

In that embodiment of the present invention wherein the ramp structure comprises the deflection plate, the ramp structure, as an alternative to including the sidewall, may comprise a flexible membrane which is attached to the fuselage and covers the deflection plate. The movement of the ramp structure to the deployed position facilitates the stretching of the flexible membrane and extension thereof between the deflection plate and the fuselage skin. Like the flexible membrane used to fabricate the sidewall, this flexible membrane is preferably fabricated from a rod reinforced elastomeric material.

In another embodiment of the present invention, the ramp structure may comprise an inflatable bladder which is attached to the fuselage. The bladder is sized and configured so as to be substantially flush or continuous with the fuselage skin when the ramp structure is in the undeployed position, with at least a portion of the bladder extending angularly relative to the fuselage skin when the ramp structure is in the deployed position. The actuator used in conjunction with the bladder is in fluid communication therewith and operative to selectively infuse air thereinto and vent or evacuate air therefrom. The infusion of air into the bladder facilitates the movement thereof to the deployed position, with the venting or evacuation of air from within the bladder facilitating the movement thereof to the undeployed position. The bladder is itself preferably fabricated from a rod reinforced elastomeric material. In yet another embodiment of the present invention, the ramp structure may comprise a flexible membrane which is attached to the fuselage. The flexible membrane is substantially flush or continuous with the fuselage skin when the ramp structure is in the undeployed position, with at least a portion of the flexible membrane extending angularly relative to the fuselage skin when the ramp structure is in the deployed position. The flexible membrane is also preferably fabricated from a rod reinforced elastomeric material.

The ramp mechanism of the present invention further preferably comprises a control system which is electrically connected to the actuator. The control system is operative to move the ramp structure to the deployed position upon the movement of the door to the open position, and to selectively adjust the angular orientation of the ramp structure relative to the fuselage skin to accommodate different flight conditions of the aircraft. The control system may comprise a flight control computer of the aircraft, or alternatively at least one sensor disposed within the interior cavity.

BRIEF DESCRIPTION OF THE DRAWINGS

These, as well as other features of the present invention, will become more apparent upon reference to the drawings wherein.

DETAILED DESCRIPTION OF THE PREFERRED EMBODIMENTS

Figure 1:
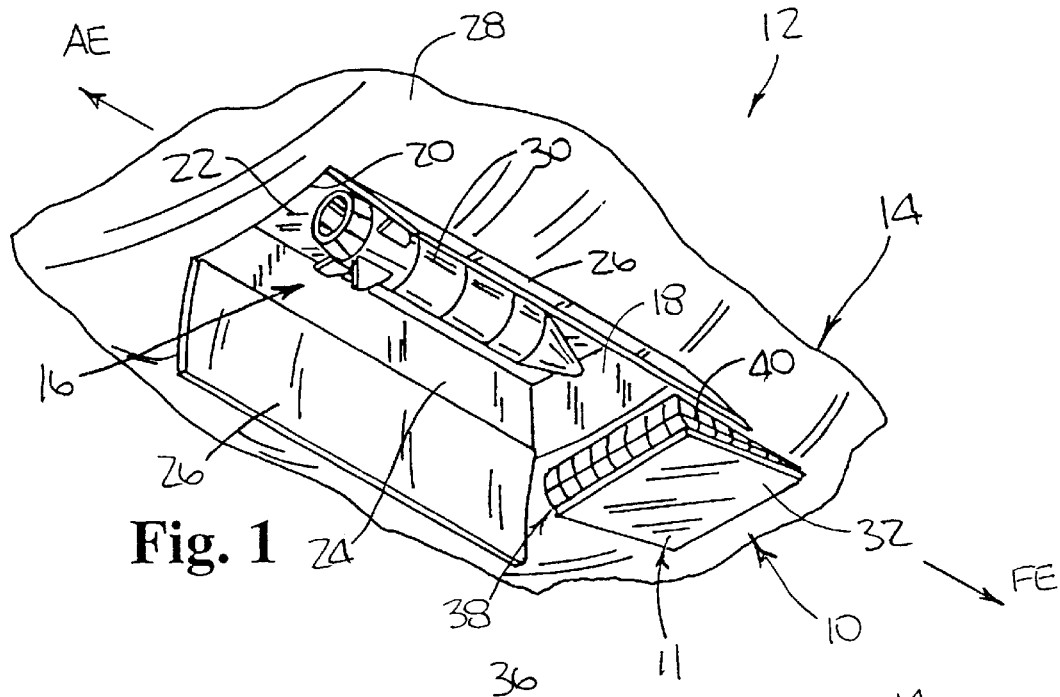
FIG. 1 is a partial perspective view of the underside of an aircraft fuselage including an opened weapons bay, illustrating an adaptive deployment ramp constructed in accordance with a first embodiment of the present invention in a deployed state.

Referring now to the drawings wherein the showings are for purposes of illustrating preferred embodiments of the present invention only, and not for purposes of limiting the same, FIG. 1 perspectively illustrates an adaptive ramp mechanism 10 constructed in accordance with a first embodiment of the present invention. The ramp mechanism 10 is adapted for use with an aircraft 12 such as a military aircraft having a fuselage 14 which includes an interior cavity or weapons bay 16. The weapons bay 16 is defined by a front or forward wall 18, a rear or aft wall 20, an interior top wall 22, and an opposed, longitudinally extending pair of sidewalls 24 of the fuselage 14. The aircraft 12 also includes a pair of weapons bay doors 26 which are pivotally connected to the fuselage 14 and selectively movable between an open position (shown in FIGS. 1 and 5) and a closed position (shown in FIG. 4). When in the open position, the weapons bay doors 26 expose the weapons bay 16. Conversely, the movement of the weapons bay doors 26 to the closed position encloses the weapons bay 16. When the weapons bay doors 26 are in the closed position, the outer surfaces thereof are substantially flush or continuous with the outer surface of the fuselage skin 28 of the fuselage 14.

Figure 5:
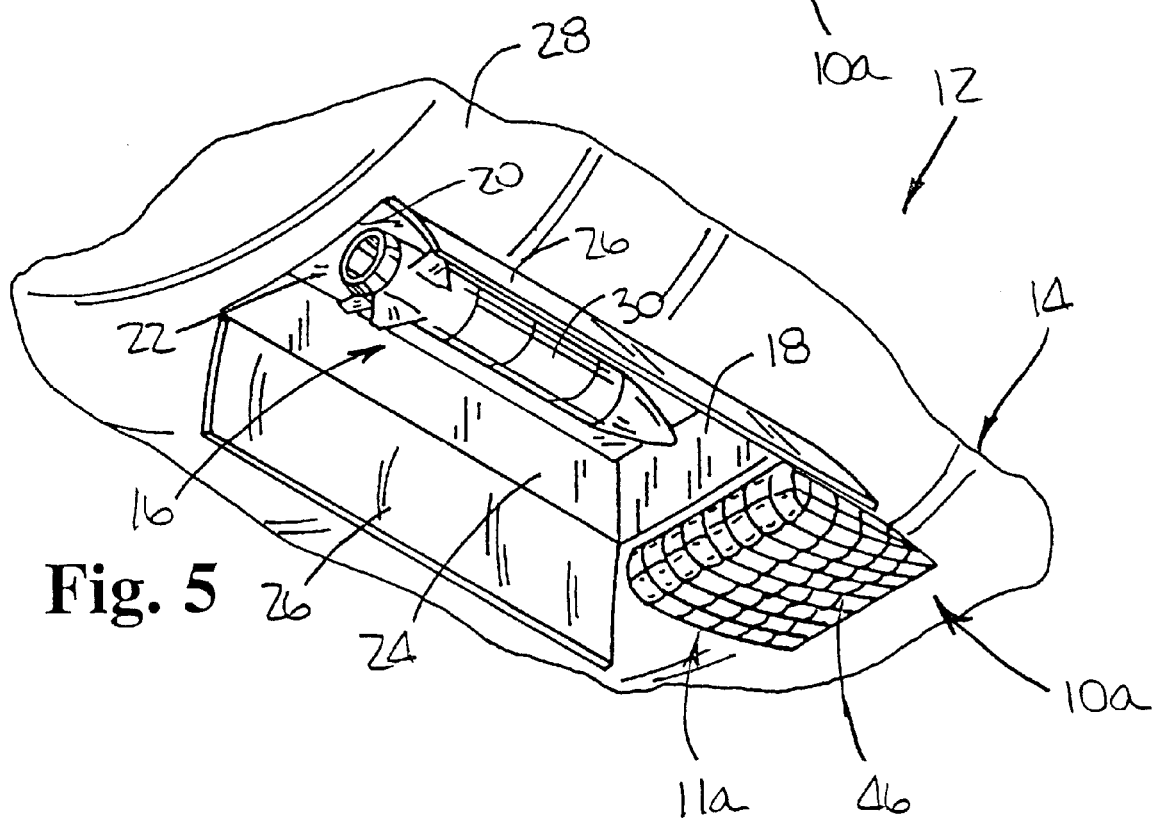
FIG. 5 is a partial perspective view of the underside of an aircraft fuselage including an opened weapons bay, illustrating the deployment ramp of the second embodiment of the present invention in a deployed state.

As indicated above, the weapons bay 16 of the aircraft 12 is typically used to accommodate military equipment and stores (e.g., munitions) such as the missile 30 shown in FIGS. 1 and 5. When the aircraft 12 is in flight and the weapons bay doors 26 are closed, a free stream of air flows along the underside of the fuselage 14 from the forward end FE toward the aft end AE thereof and attaches to the outer surfaces of the fuselage skin 28 and weapons bay doors 26. As will be recognized, when the weapons bay doors 26 are moved to their open position, this free stream of air enters the weapons bay 16, thus causing a substantial level of turbulence therewithin. This high energy air reflecting about the interior of the weapons bay 16 in a turbulent manner typically results in high loads and vibration response of aircraft structures and/or equipment/stores in and around the weapons bay 16. As also indicated above, these large unsteady forces are a potential cause of damage to the aircraft structures and/or equipment/stores, and could have adverse effects on the ejection of the equipment/stores from within the weapons bay 16.

As will be explained in more detail below, the deployable, adaptive ramp mechanism 10 of the present invention is disposed on the aircraft 12 upstream of the weapons bay 16, and is deployed as the weapons bay doors 26 are moved to the open position. When deployed, the present ramp mechanism 10 deflects the primary airflow or free stream of air such that it does not enter the weapons bay 16 to any significant degree, and such that the airflow reattaches to the outer surface of the fuselage skin 28 of the fuselage 14 beyond the aft wall 20 of the weapons bay 16. Those of ordinary skill in the art will recognize that the interior cavity of the fuselage 14 may comprise a cargo bay rather than the weapons bay 16, and that the weapons bay doors 26 may alternatively comprise cargo bay doors, with the ramp mechanism 10 being used to prevent excessive turbulence with the cargo bay and the safe ejection of equipment or stores from therewithin when the cargo bay doors are moved to the open position.

As seen in FIG. 1, the ramp mechanism 10 of the first embodiment comprises a ramp structure 11. In the first embodiment, the ramp structure 11 itself comprises a deflection plate 32 which has a generally rectangular configuration and defines a generally planar outer surface. The deflection plate 32 is pivotally connected to the underside of the fuselage 14 between the forward wall 18 of the weapons bay 16 and forward end FE of the fuselage 14. More particularly, of the four (4) peripheral edge segments defined by the deflection plate 32, the forward peripheral edge segment which is disposed furthest from the weapons bay 16 is movably (i.e., pivotally) connected to the fuselage 14 via a connector such as a hinge 34. The deflection plate 32 is preferably fabricated from a material similar or identical to that used to fabricate the fuselage skin 28 of the fuselage 14.

The ramp structure 11, and in particular the deflection plate 32 thereof, is selectively movable between a retracted or undeployed (i.e., stowed) position and an extended or deployed position. When the deflection plate 32 is in its undeployed position, the outer surface thereof is substantially flush or continuous with the outer surface of the fuselage skin 28 of the fuselage 14. When moved to its deployed position as is shown in FIGS. 1–3 and 6, the deflection plate 32 extends angularly relative to the fuselage skin 28. More particularly, since the forward peripheral edge segment of the deflection plate 32 (as opposed to the aft or side peripheral edge segments thereof) is pivotally connected to the fuselage 14, the movement of the deflection plate 32 to its deployed position results in the formation of an acute angle A (shown in FIG. 3) between the inner surface of the deflection plate 32 and the fuselage 14, and an obtuse angle between the outer surface of the deflection plate 32 and the fuselage skin 28 of the fuselage 14. As will be discussed in more detail below, the acute angle A is not necessarily fixed when the deflection plate 32 is moved to its deployed position, but rather may be selectively increased or decreased depending on the flight conditions of the aircraft 12.

Figure 2:
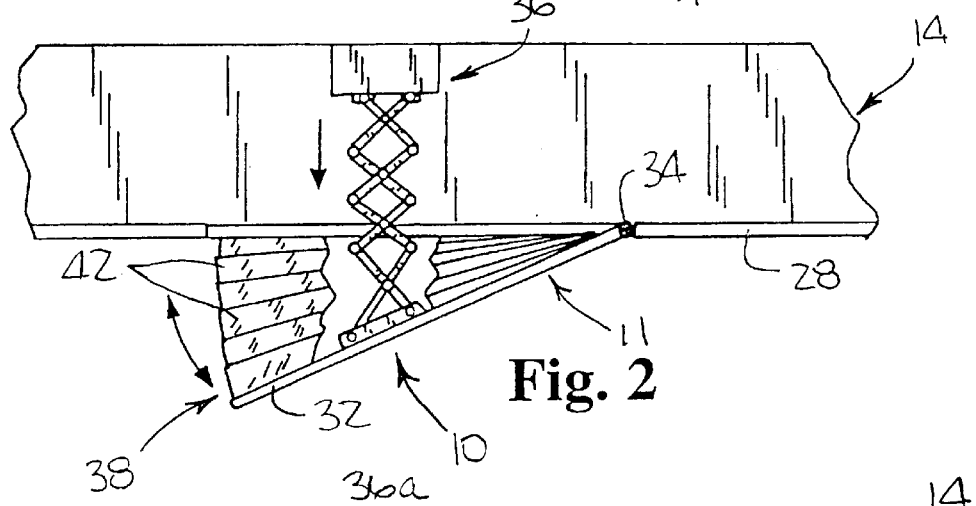
FIG. 2 is a side-elevational view of a modified version of the deployment ramp shown in FIG. 1 including an alternative sidewall structure.

In addition to the deflection plate 32, the ramp mechanism 10 comprises an actuator 36 which is mechanically coupled to the deflection plate 32 and operative to move it between its undeployed and deployed positions. As seen in FIG. 2, the actuator 36 may comprise a scissor lift mechanism which is attached to and extends between the fuselage 14 and the inner surface of the deflection plate 32. Typically, the actuator 36 will be attached to the deflection plate 32 closer to the aft peripheral edge segment thereof (i.e., the peripheral edge segment disposed closest to the weapons bay 16) than to the forward peripheral edge segment thereof. As such, the deflection plate 32 is preferably lifted by the actuator 36 at its aft peripheral edge segment in close proximity to the forward wall 18 of the weapons bay 16.

As further seen in FIG. 1, the ramp structure 11 of the ramp mechanism 10 also includes an extensible and collapsible sidewall 38 which is attached to the deflection plate 32 and extends between the fuselage skin 28 and the deflection plate 32 when the deflection plate 32 is moved to its deployed position. More particularly, when the deflection plate 32 is moved to its deployed position, the sidewall 38 of the ramp structure 11 is extended or expanded so as to extend between the aft and side peripheral edge segments of the deflection plate 32 and the fuselage skin 28. As seen in FIG. 1, in the first embodiment of the ramp mechanism 10, the sidewall 38 comprises a deformable or flexible membrane 40 which is expanded or stretched when the deflection plate 32 is moved to its deployed position. The flexible membrane 40 is preferably fabricated from a rod reinforced elastomeric material such as a CMT (continuous moldline technology) material as is described in Applicant's U.S. Pat. Nos. 5,794,893 and 5,803,405.

Figure 3:
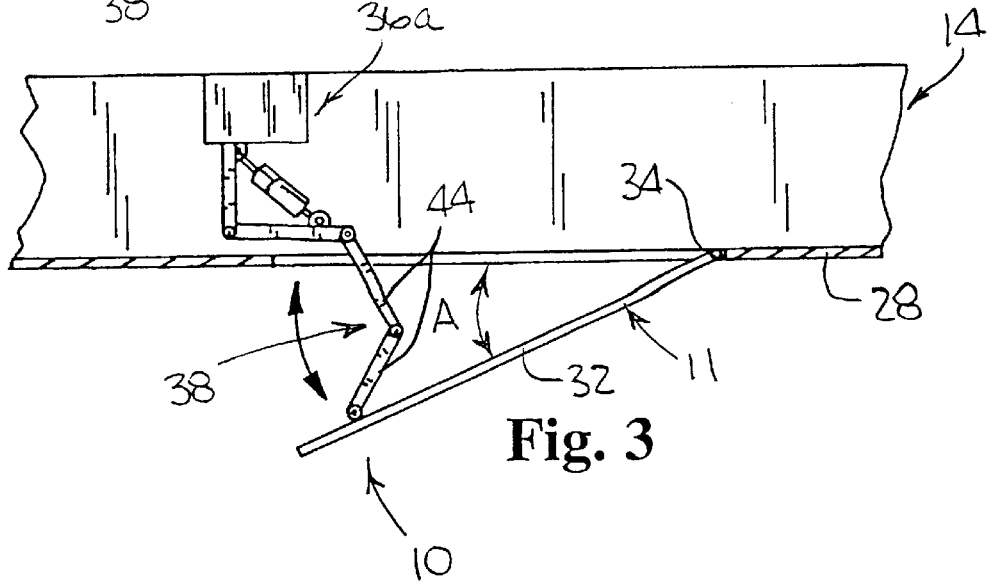
FIG. 3 is a side-elevational view of a modified version of the deployment ramp shown in FIG. 1 including an alternative sidewall structure and actuator.

In a first modified version of the ramp structure 11 of the ramp mechanism 10 which is shown in FIG. 2, the sidewall 38, rather than comprising the flexible membrane 40, comprises a series of sliding plates 42 which deploy when the deflection plate 32 is moved to its deployed position. The sliding plates 42 may be fabricated from a metallic material similar to that used to fabricate the deflection plate 32 and/or fuselage skin 28. In a second modified version of the ramp structure 11 of the ramp mechanism 10 which is shown in FIG. 3, the sidewall 38 comprises a series of folding plates 44 which, like the sliding plates 42, deploy when the deflection plate 32 is moved to its deployed position. Each of the folding plates 44 may also be fabricated from a metallic material similar to that used to fabricated the deflection plate 32 and/or fuselage skin 28. As further seen in FIG. 3, when the folding plates 44 are used to form the sidewall 38, it is contemplated that the ramp mechanism 10 may be provided with an actuator 36a which, rather than being attached to the inner surface of the deflection plate 32, is mechanically coupled to one of the folding plates 44 of that set which is disposed closest to the aft peripheral edge segment of the deflection plate 32. The sliding plates 42 and folding plates 44, like the stretchable flexible membrane 40, adjust in height with adjustments to the height of the deflection plate 32 (i.e., increases or decreases in the acute angle A). In FIG. 3, only the folding plates 44 which are extended between the aft peripheral edge segment of the deflection plate 32 and the fuselage skin 28 are shown. In this respect, it will be recognized that the alternative sidewall 38 depicted in FIG. 3 includes additional sets of folding plates 44 which are also expanded and retracted in an accordion-like fashion and are extensible between the fuselage skin 28 and respective ones of the side peripheral edge segments of the deflection plate 32.

Though not shown, a still further alternative embodiment of the sidewall 38 may comprise a rigid wall structure which is not expandable or collapsible, but rather is selectively advanced from or retracted into the interior of the fuselage 14 via a corresponding slot disposed within the fuselage skin 28. Advantageously, the inclusion of the sidewall 38 in the ramp structure 11 maximizes its efficacy in directing air flow over the weapons bay 16 as will be described in more detail below.

Those of ordinary skill in the art will recognize that in the ramp structure 11, the deflection plate 32 need not necessarily be substantially flush or continuous with the fuselage skin 28. In this respect, it is contemplated that the deflection plate 32 may be pivotally connected to the fuselage 14, but extend along the outer surface of the fuselage skin 28 in generally parallel relation thereto when the ramp structure 11 is in the undeployed position. The deflection plate 32, if extending in generally parallel relation to the fuselage skin 28 when the ramp structure 11 is in the undeployed position, would still extend angularly relative to the fuselage 14 when the ramp structure 11 is moved to the deployed position. In this alternative configuration, the deflection plate 32, rather than essentially being a movable section of the fuselage skin 28, is a secondary external shell which extends along the exterior of the fuselage skin 28.

Figure 4:
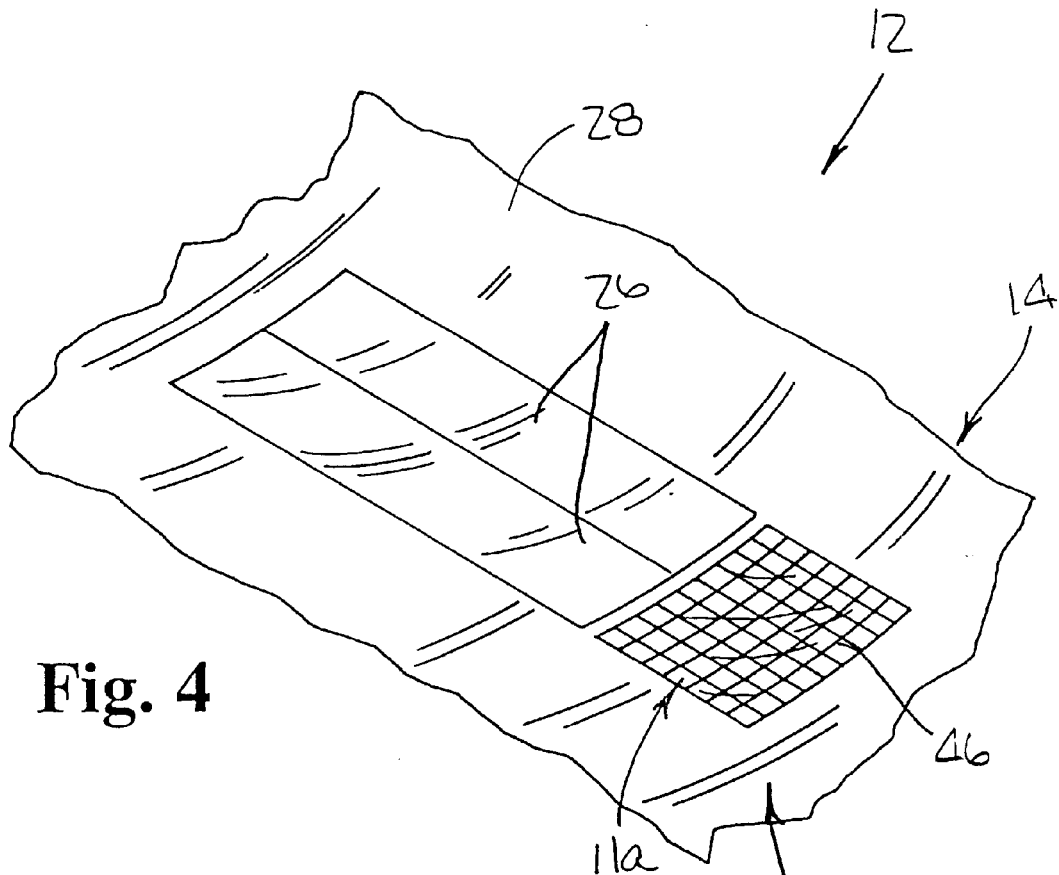
FIG. 4 is partial perspective view of the underside of an aircraft fuselage including a closed weapons bay, illustrating an adaptive deployment ramp constructed in accordance with a second embodiment of the present invention in an undeployed state.

Referring now to FIGS. 4 and 5, there is depicted a ramp mechanism 10a constructed in accordance with a second embodiment of the present invention which is similar in structure and function to the previously described ramp mechanism 10. The ramp mechanism 10a of the second embodiment includes a ramp structure 11a which is similar to the previously described ramp structure 11 but does not include the sidewall 38. Also included in the ramp mechanism 10a is the actuator 36 which is mechanically coupled to the deflection plate 32 of the ramp structure 11a. Due to the elimination of the sidewall 38 in the ramp structure 11a, the deflection plate 32 thereof is covered with a generally rectangularly-shaped deformable, flexible membrane 46 which constitutes part of the ramp structure 11a and is of a size exceeding that of the deflection plate 32. In this respect, the peripheral edge segments of the flexible membrane 46 protrude outwardly beyond respective ones of the peripheral edge segments of the deflection plate 32, and are secured to the fuselage 14 and/or fuselage skin 28 thereof. The central portion of the flexible membrane 46 covers the outer surface of the deflection plate 32 and may be adhered thereto by, for example, an adhesive. As seen in FIG. 5, the movement of the deflection plate 32 of the ramp structure 11a to its deployed position facilitates the stretching of the flexible membrane 46, which allows it to act or function in the same manner as the sidewall 38. The flexible membrane 46, like the previously described flexible membrane 40, is preferably fabricated from a rod reinforced elastomeric material.

It is contemplated that, as an alternative to the deflection plate 32, other structures may be employed in the ramp mechanism 10a to facilitate the movement of the ramp structure 11a from its undeployed position shown in FIG. 4 whereat the flexible membrane 46 thereof is in its unstretched state, to its deployed position shown in FIG. 5 whereat the flexible membrane 46 thereof is in its stretched state. In this respect, a system of support elements and linkages could be mechanically coupled to the actuator 36 in a manner causing the flexible membrane 46 to assume the stretched configuration shown in FIG. 5 whereat a portion of the flexible membrane 46 extends angularly relative to the fuselage skin 28 in the same manner as does the deflection plate 32 when moved to the deployed position. Stated another way, the mechanism disposed beneath the flexible membrane 46 would effectively stretch the same into the desired wedge shape on the underside the fuselage 14. In this alternative arrangement, the flexible membrane 46 would be substantially flush or continuous with the outer surface of the fuselage skin 28 in the manner shown in FIG. 4 when the ramp structure 11a is in its undeployed position, with a portion of the flexible membrane 46 extending angularly relative to the fuselage skin 28 in the manner shown in FIG. 5 when the ramp structure 11a is in its deployed position. In this alternative arrangement, the material used to fabricate the flexible membrane 46 would need to be of sufficient structural integrity/rigidity so as to allow a substantial portion thereof to be maintained in an angular orientation relative to the fuselage skin 28 despite the same not being supported in its entirety by the underlying deflection plate 32.

Further in accordance with the present invention, it is contemplated that the ramp mechanism may comprise an inflatable bladder which constitutes the ramp structure thereof and is attached to the underside of the fuselage 14 at the same location as the ramp mechanisms 10, 10a. The bladder would be in an undeployed position when in a deflated state, and would be capable of assuming a deployed position when inflated with a fluid, such as air. The bladder would be specifically configured such that, when in the deflated, undeployed position, the same would be substantially flush or continuous with the outer surface of the fuselage skin 28 in the same manner shown in FIG. 4. When inflated to the deployed position, the bladder would assume the same configuration shown in FIG. 5 in relation to the flexible membrane 46 wherein a portion of the bladder would extend angularly relative to the fuselage skin 28. In the ramp mechanism comprising the inflatable bladder, the associated actuator would be in fluid communication with the bladder and operative to selectively infuse air thereinto and vent or evacuate air therefrom. As indicated above, the infusion of air into the bladder would facilitate the movement thereof to the deployed position, with the venting or evacuation of air from within the bladder facilitating the movement thereof to the undeployed position. The bladder itself would also preferably be fabricated from a rod reinforced elastomeric material.

As indicated above, the height or angular orientation of the ramp structure 11, 11a (or bladder) relative to the fuselage skin 28 is not necessarily fixed, but is selectively adjustable to accommodate different flight conditions of the aircraft 12. This height adjustment of the ramp structure 11, 11a is preferably accomplished in an adaptive manner wherein the optimal height thereof is adjusted as a function of flight conditions. To achieve this adaptive control, the ramp mechanism 10, 10a further preferably comprises a control system 48 which is electrically connected to the actuator 36 used in conjunction with the ramp structure 11, 11a. The control system 48 is operative to move the ramp structure 11, 11a to the deployed position upon movement of the weapons bay doors 26 to the open position, and to selectively adjust the angular orientation of the ramp structure 11, 11a (e.g., the deflection plate 32, flexible membrane 46, or bladder) relative to the fuselage skin 28 to accommodate different flight conditions of the aircraft.

Figures 7A, 7B:
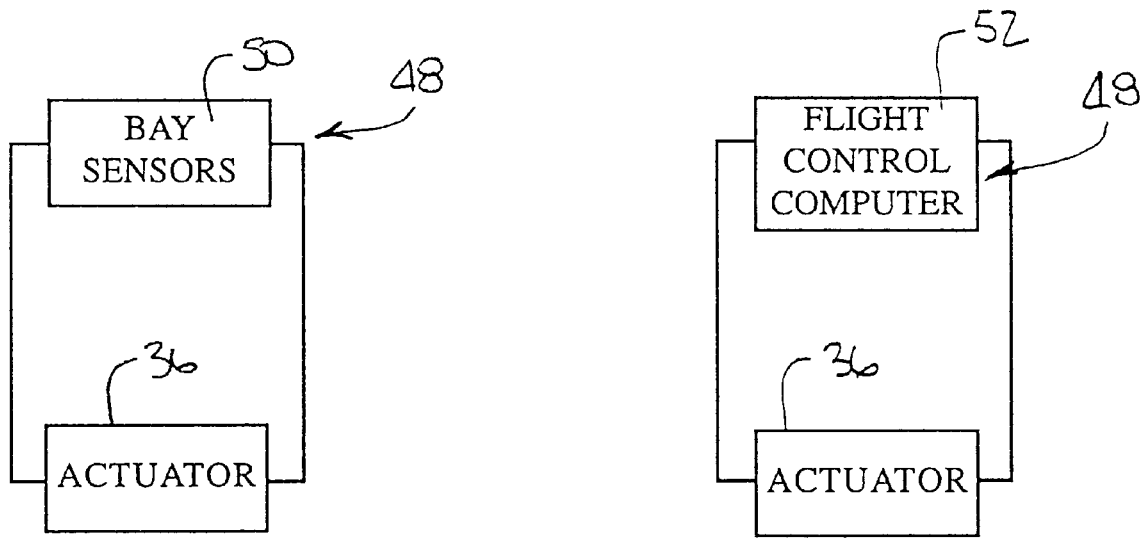
FIGS. 7A and 7B are schematic representations of alternative versions of a control system which may be used in conjunction with the deployment ramp constructed in accordance with either the first or second embodiments of the present invention.

As seen in FIG. 7A, it is contemplated that the control system 48 may comprise a closed loop control system in which one or more bay sensors 50 are disposed within the weapons bay 16 and operative to both measure the acoustic levels therein and iteratively adjust the height of the ramp structure 11, 11a (i.e., the angular orientation thereof relative to the fuselage skin 28) until the acoustic levels measured by the bay sensor(s) 50 are below acceptable thresholds. As seen in FIG. 7B, the optimal height of the ramp structure 11, 11a may also be adjusted as a function of the flight condition of the aircraft 12. In this case, the optimal position or height of the ramp structure 11, 11a is known from experimentation or analysis, with the height of the ramp structure 11, 11a being controlled by the flight control computer 52 of the aircraft 12 which constitutes part of the control system 48 and is continually sampling the state of the aircraft 12. It is further contemplated that the control system of the ramp mechanism 10, 10a may comprise a combination of those shown in FIGS. 7A and 7B. Additionally, in accordance with a further alternative embodiment of the present invention, the control system may be configured to facilitate the deployment of the ramp structure 11, 11a to a position which has been determined to be the optimal mean position. The control system would then be operative to command the movement of the ramp structure 11, 11a about the mean position with relatively small displacements compared to the initial or optimal mean position. The frequency of oscillation would be such that improvements in acoustic suppression and store separation would be realized by tailoring the turbulent shear layer.

Figure 6:
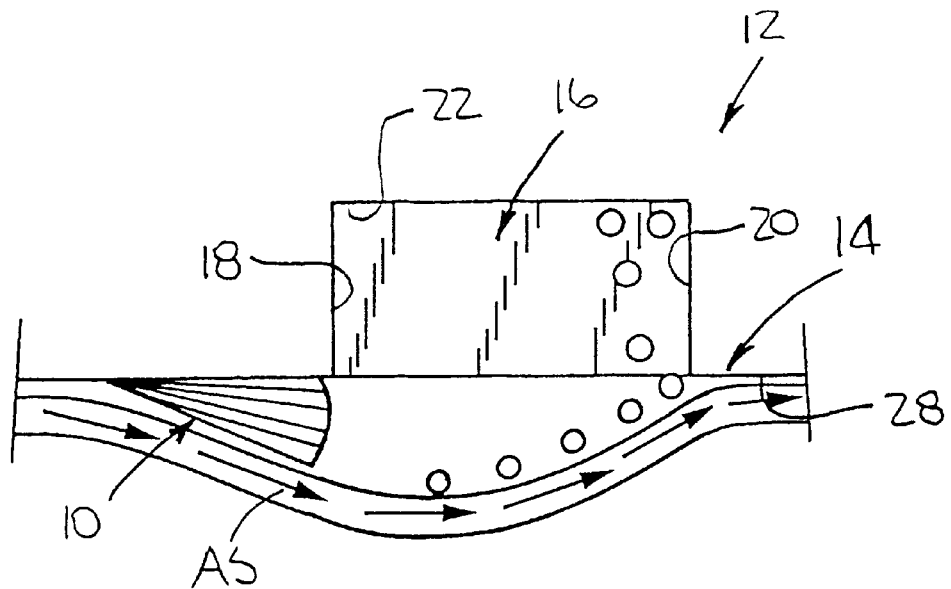
FIG. 6 is a schematic representation illustrating the manner in which the deployment ramp constructed in accordance with either the first or second embodiments of the present invention functions to deflect primary airflow over the opened weapons bay.

Referring now to FIG. 6, when the weapons bay doors 26 are in the closed position and the aircraft 12 is in flight, a free stream of air AS flows along the underside of the fuselage 14 from the forward end FE to the aft end AE thereof. This air stream AS is attached to the outer surface of the fuselage skin 28 and the outer surfaces of the closed weapons bay doors 26. Since the ramp structure 11, 11a is in its undeployed position when the weapons bay doors 26 are in their closed position, the air stream AS also attaches the outer surface of the deflection plate 32 or flexible membrane 46 thereof (or to the exposed surface of the deflated bladder). As indicated above, the control system 48 moves the ramp structure 11, 11a to its deployed position upon the movement of the weapons bay doors 26 to the open position. Importantly, the movement of the ramp structure 11, 11a to its deployed position upon the opening of the weapons bay doors 26 facilitates a deflection of the air stream AS by the ramp structure 11, 11a over the now exposed weapons bay 16 in the manner shown in FIG. 6. After being deflected over the weapons bay 16, the air stream AS reattaches to the outer surface of the fuselage skin 28 between the weapons bay 16 and the aft end AE of the fuselage 14. As will be recognized, the deflection of the air stream AS facilitated by the movement of the ramp structure 11, 11a to its deployed position substantially reduces the level of turbulence within the interior of the weapons bay 16. The return of the weapons bay doors 26 to the closed position occurs concurrently with the return of the ramp structure 11, 11a to its undeployed position whereat, as indicated above, it is substantially flush or continuous with the outer surface of the fuselage skin 28.

Additional modifications and improvements of the present invention may also be apparent to those of ordinary skill in the art. Thus, the particular combination of parts and steps described and illustrated herein is intended to represent only certain embodiments of the present invention, and is not intended to serve as limitations of alternative devices within the spirit and scope of the invention.

What is claimed is:

1. An adaptive ramp mechanism for an aircraft having a fuselage which includes a fuselage skin, an interior cavity, a forward end and an aft end, and at least one door attached to the fuselage and movable between an open position exposing the interior cavity and a closed position enclosing the interior cavity, the ramp mechanism comprising:

a ramp structure attached to the fuselage between the forward end and the interior cavity thereof, the ramp structure comprising:
      a deflection plate pivotally connected to the fuselage; and
      a flexible membrane attached to the fuselage and covering the deflection plate;

the ramp structure being movable between an undeployed position whereat the deflection plate is substantially continuous with the fuselage skin such that when the doors are in the closed position, a free stream of air flowing along the fuselage is attached to the fuselage skin and the door, and a deployed position whereat the deflection plate extends angularly relative to the fuselage skin such that when the door is in the open position, the free stream of air is deflected over the interior cavity and reattaches to the fuselage skin between the interior cavity and the aft end of the fuselage, the movement of ramp structure to the deployed position facilitating the stretching of the membrane and extension thereof between the deflection plate and the fuselage skin.

2. The ramp mechanism of claim 1 further comprising an actuator mechanically coupled to the ramp structure for facilitating the movement thereof between the undeployed and deployed positions.

3. The ramp mechanism of claim 2 wherein the actuator comprises a scissor-lift mechanism attached to and extending between the fuselage and the deflection plate.

4. The ramp mechanism of claim 1 wherein the membrane is fabricated from a rod reinforced elastomeric material.

5. In an aircraft having a fuselage which includes a fuselage skin, an interior cavity, a forward end and an aft end, and at least one door attached to the fuselage and movable between an open position exposing the interior cavity and a closed position enclosing the interior cavity, a method of substantially preventing the flow of a free stream of air into the interior cavity upon the movement of the door to the open position during aircraft flight, comprising the steps of:

(a) providing a ramp structure which is attached to the fuselage between the forward end and the interior cavity thereof;

(b) moving the ramp structure from an undeployed position whereat the ramp structure is substantially continuous with the fuselage skin to a deployed position whereat the ramp structure extends angularly relative to the fuselage skin and substantially deflects the free stream of air over the interior cavity upon the movement of the door to the open position; and (c) selectively adjusting the angular orientation of the ramp structure relative to the fuselage skin during aircraft flight to accommodate different flight conditions of the aircraft.

6. In an aircraft having a fuselage which includes a fuselage skin, a weapons bay, a forward end and an aft end, and at least one weapons bay door attached to the fuselage and moveable between an open position exposing the weapons bay and a closed position enclosing the weapons bay, the improvement comprising a ramp mechanism for substantially mitigating turbulence within the weapons bay upon the movement of the weapons bay door to the open position during aircraft flight, the ramp mechanism comprising:

a ramp structure pivotally connected to the fuselage between the forward end and the weapons bay thereof, the ramp structure being moveable between an undeployed position whereat it is substantially continuous with the fuselage skin and a deployed position whereat it extends angularly relative to the fuselage skin;

an actuator mechanically coupled to the ramp structure for facilitating the movement thereof between the undeployed and deployed positions; and a control system in electrical communication with the actuator and operative to facilitate the movement of the ramp structure from the undeployed position to the deployed position upon the movement of the weapons bay door to the open position, and selectively adjust the angular orientation of the ramp structure relative to the fuselage skin during aircraft flight to accommodate different flight conditions of the aircraft;

the movement of the ramp structure to the deployed position upon the movement of the weapons bay door to the open position facilitating the deflection of a free stream of air over the weapons bay.

7. An adaptive ramp mechanism for an aircraft having a fuselage which includes a fuselage skin, an interior cavity, a forward end and an aft end, and at least one door attached to the fuselage and movable between an open position exposing the interior cavity and a closed position enclosing the interior cavity, the ramp mechanism comprising:

a ramp structure attached to the fuselage between the forward end and the interior cavity thereof, the ramp structure comprising an inflatable bladder attached to the fuselage;

the ramp structure being movable between an undeployed position whereat the bladder is substantially continuous with the fuselage skin such that when the door is in the closed position, a free stream of air flowing along the fuselage is attached to the fuselage skin and the door, and a deployed position whereat at least a portion of the bladder extends angularly relative to the fuselage skin such that when the door is in the open position, the free stream of air is deflected over the interior cavity and reattached to the fuselage skin between the interior cavity and the aft end of the fuselage.

8. The ramp mechanism of claim 7 further comprising an actuator mechanically coupled to the ramp structure for facilitating the movement thereof between the undeployed and deployed positions.

9. The ramp mechanism of claim 7 further comprising an actuator in fluid communication with the bladder and operative to selectively infuse air thereinto and vent air therefrom, the infusion of air into the bladder facilitating the movement thereof to the deployed position, with the venting of air from within the bladder facilitating the movement thereof to the undeployed position.

10. The ramp mechanism of claim 7 wherein the bladder is fabricated from a rod reinforced elastomeric material.

11. An adaptive ramp mechanism for an aircraft having a fuselage which includes a fuselage skin, an interior cavity, a forward end and an aft end, and at least one door attached to the fuselage and movable between an open position exposing the interior cavity and a closed position enclosing the interior cavity, the ramp mechanism comprising:

a ramp structure attached to the fuselage between the forward end and the interior cavity thereof, the ramp structure comprising a flexible membrane attached to the fuselage;

the ramp structure being movable between an undeployed position whereat the flexible membrane is substantially continuous with the fuselage skin such that when door is in the closed position, a free stream of air flowing along the fuselage is attached to the fuselage skin and the door, and a deployed position whereat at least a portion of the flexible membrane extends angularly relative to the fuselage skin such that when the door is in the open position, the free stream of air is deflected over the interior cavity and reattaches to the fuselage skin between the interior cavity and the aft end of the fuselage.

12. The ramp mechanism of claim 11 further comprising an actuator mechanically coupled to the ramp structure for facilitating the movement thereof between the undeployed and deployed positions.

13. The ramp mechanism of claim 11 wherein the flexible membrane is fabricated from a rod reinforced elastomeric material.

14. An adaptive ramp mechanism for an aircraft having a fuselage which includes a fuselage skin, an interior cavity, a forward end and an aft end, and at least one door attached to the fuselage and movable between an open position exposing the interior cavity and a closed position enclosing the interior cavity, the ramp mechanism comprising:

a ramp structure attached to the fuselage between the forward end and the interior cavity thereof, the ramp structure being movable between and undeployed position whereat it is substantially continuous with the fuselage skin such that when the door is in the closed position, a free stream of air flowing along the fuselage is attached to the fuselage skin and the door, and a deployed position whereat at least a portion thereof extends angularly relative to the fuselage skin such that when the door is in the open position, the free stream of air is deflected over the interior cavity and reattaches to the fuselage skin between the interior cavity and aft end of the fuselage;

an actuator mechanically coupled to the ramp structure for facilitating the movement thereof between the undeployed and deployed positions; and a control system comprising a flight control computer electrically connected to the actuator and operative to move the ramp structure to the deployed position upon the movement of the door to the open position, and selectively adjust the angular orientation of the ramp structure relative to the fuselage skin to accommodate different flight conditions of the aircraft.

15. An adaptive ramp mechanism for an aircraft having a fuselage which includes a fuselage skin, an interior cavity, a forward end and an aft end, and at least one door attached to the fuselage and movable between an open position exposing the interior cavity and a closed position enclosing the interior cavity, the ramp mechanism comprising:

a ramp structure attached to the fuselage between the forward end and the interior cavity thereof, the ramp structure being movable between and undeployed position whereat it is substantially continuous with the fuselage skin such that when the door is in the closed position, a free stream of air flowing along the fuselage is attached to the fuselage skin and the door, and a deployed position whereat at least a portion thereof extends angularly relative to the fuselage skin such that when the door is in the open position, the free stream of air is deflected over the interior cavity and reattaches to the fuselage skin between the interior cavity and aft end of the fuselage;

an actuator mechanically coupled to the ramp structure for facilitating the movement thereof between the undeployed and deployed positions; and a control system comprising at least one sensor disposed within the interior cavity and operative to move the ramp structure to the deployed position upon the movement of the door to the open position, and selectively adjust the angular orientation of the ramp structure relative to the fuselage skin to accommodate different flight conditions of the aircraft.

* * * * *